Figure 1:
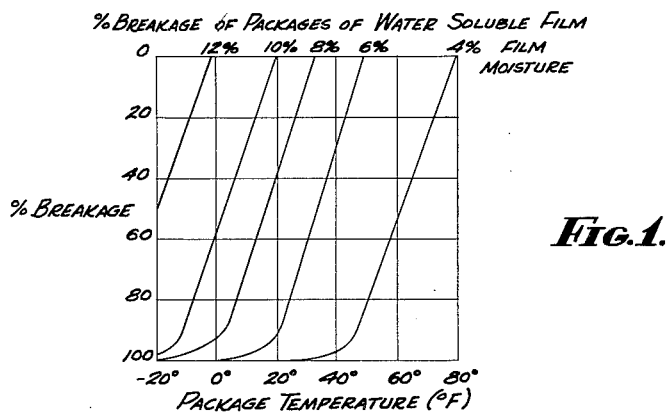

INVENTORS.
HENRY A. DUNLOP, JR.,
ROBERT H. CHAFFEE,
BY
ATTORNEYS.

United States Patent Office 3,198,740
Patented Aug. 3, 1965

3,198,740
PACKET OF WATER-SOLUBLE FILM OF POLY-
VINYL ALCOHOL FILLED WITH DETERGENT
COMPOSITION
Henry A. Dunlop, Jr., Woodlawn, and Robert H. Chaffee,
Cincinnati, Ohio, assignors to The Procter & Gamble
Company, Cincinnati, Ohio, a corporation of Ohio
Filed June 22, 1960, Ser. No. 38,000
3 Claims. (Cl. 252—90)

This invention relates to packets prepared from water-soluble films of polyvinyl alcohol and filled with non-liquid synthetic detergent compositions. More particularly, the invention relates to a method of preparing packets of a water-soluble film of polyvinyl alcohol which contain a non-liquid synthetic detergent composition having sodium tripolyphosphate among its ingredients, and possess improved resistance to premature rupture prior to usage.

It has become common practice to package unit containers of a wide variety of materials, both solid and liquid, especially for use in the household, in packets made from plastic film. Such packets possess many advantages, among them being the attractive appearance of materials so packaged; the pre-measurement of the packet contents for a single use so that when the contents of the unit packet are used sufficient of the product will be present to perform the desired task efficiently; and the reduction in the degree of inconvenience or hazard in using in household work bulk materials which are dusty or otherwise undesirable if allowed to come in contact with the user. Formerly the plastic films used, such as cellophane, polyethylene and polyvinyl chloride have not been soluble in water.

Recently several plastic materials have become available which are water-soluble and can be formed into plastic films for preparation of unit packages. Several of the newly available water-soluble plastic films are satisfactory for human consumption and thus can be used to prepackage foods and medicaments. Packets of water-soluble film are especially useful as containers for pre-measured quantities of detergent materials. Use of the water-soluble packets obviously provides added convenience and safety to the housewife who simply drops the unit packet into water eliminating the opening and disposal of the former water-insoluble packets.

However, a defect in such packets heretofore has served to limit seriously their potential widespread use. Packets formed from the available water-soluble thermoplastic films of polyvinyl alcohol have been found to rupture, especially at temperatures below about 50° F., when subjected to the unavoidable impacts inherent in handling in the warehouse, in loading and unloading the carrier, and during transit in the carrier. Failure of even one unit packet of the film within a container of several such units containing a flowable solid is unacceptable as the contents of the ruptured unit packet are spilled over the remaining intact unit packets destroying the attractiveness and convenience of the remaining intact packets. The percentage of premature rupture of the unit packets prepared from a water-soluble plastic film has been found to increase sharply for a given intensity of shock history as the temperature of exposure falls below about 50° F. For some materials packaged in this manner the frequency of premature failure of the unit packets is found to be considerably higher even than would be expected for the conditions of shock and temperature exposure involved, and synthetic detergent compositions which contain sodium tripolyphosphate are illustrative of this group of materials.

Accordingly, it is an object of this invention to provide synthetic detergent compositions for household use in convenient and practical packet units by encasing appropriate quantities of the composition in a water-soluble film of polyvinyl alcohol.

It is also an object of this invention to prepare packets of a water-soluble film of polyvinyl alcohol which do not rupture and release their contents as a result of the impacts encountered during shipment to market at cool temperatures.

It is another object of this invention to prepare packets of a water-soluble film of polyvinyl alcohol which may be filled with a premeasured amount of a non-liquid synthetic detergent composition and which possess increased resistance to rupture during normal handling during cool weather.

It is also an object of this invention to prepare filled packets of a water-soluble film of polyvinyl alcohol which are as resistant to rupture during handling in winter as in summer.

It is still another object of this invention to make packets of a water-soluble film of polyvinyl alcohol containing a non-liquid synthetic detergent composition having sodium tripolyphosphate among its ingredients which may be shipped to market in winter without rupturing and losing their contents before usage.

Briefly, and as more fully described hereinafter, the present invention is directed to the selection of appropriate hydrated salts and use thereof in combination with the remainder of the contents of the package to provide a reservoir of moisture which is released to establish the desired vapor pressure relationships and thereby maintain the moisture content of the plastic film at a high enough level to inhibit the development of brittleness.

Means have now been found for providing filled packets of water-soluble films of polyvinyl alcohol which will withstand, without premature rupture, the shocks encountered in shipment to the market at temperatures encountered in severe winter weather. Packets of water-soluble film prepared according to this invention do not break in winter shipment even when filled with a non-liquid synthetic detergent composition having sodium tripolyphosphate among its ingredients.

The water-soluble films which can be used in the packets of this invention range in thickness from about one-quarter to about three mils. Thinner films do not possess the necessary tensile strength to carry the weight of the packet contents without rupturing, and thicker films are uneconomical in cost. Several filled unit packets of water-soluble films may be placed within a carton prior to storage and shipment and several cartons placed within a shipping container, which normally consists of paperboard or other stiff or rigid material for added protection. Or, the unit packets may be placed directly within a shipping container.

It has been found that the cause of the premature rupture of packets prepared from a water-soluble film of polyvinyl alcohol, when the packets are subjected to shock at low temperatures, has been brittleness induced by loss of the normal moisture content of the water-soluble film. For packets of a water-soluble film of polyvinyl alcohol filled with a given composition there exists an inverse relation between the minimum moisture content of the film and the temperature at which it will be found to crack when subjected to a given intensity of shock. Thus, the film requires an increasing moisture content in order to resist, without rupture, a given intensity of shock as the temperature of exposure is lowered. Although embrittlement of plastic film resulting from exposure to cold alone may be a contributing factor, the primary cause of premature breakage of the film is the loss in plasticity due to loss in moisture content, as with a high enough moisture content in the film of the packet complete freedom from premature rupture during shipment in winter weather is easy to obtain. Water-soluble films by their nature are permeable to water vapor and thus they easily reach equilibrium in their moisture content with the moisture content of the surrounding atmosphere and one cannot solve the problem simply by increasing the moisture content of the film, or by incorporating in the film a hygroscopic material as glycerine, as the film quickly loses its absorbed water content by evaporation until its water content comes into equilibrium with the surroundings, thus drying out to a moisture content which at low temperatures is too low to maintain the film in the desired plastic condition.

Figure 2:
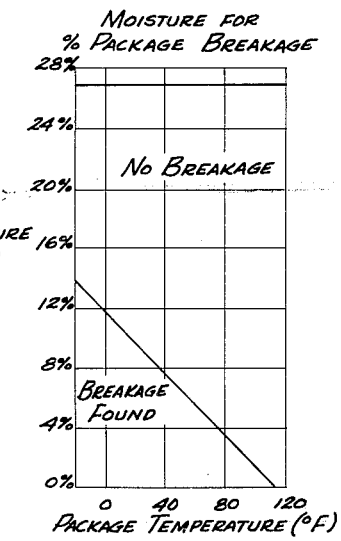
Figure 3:
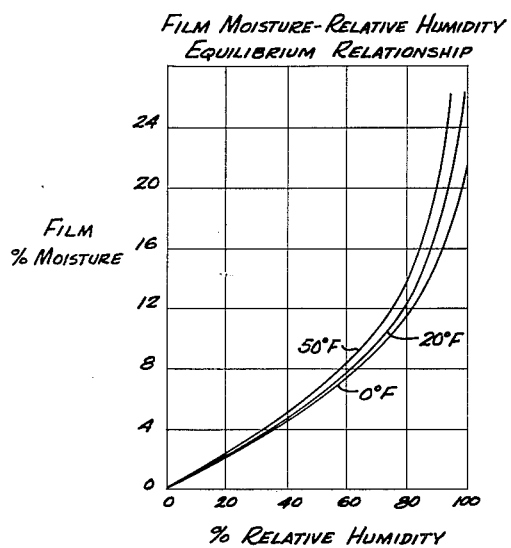

In the accompanying drawings:

FIGURE 1 illustrates the relationship found in the percent breakage in unit packets of polyvinyl alcohol filled with the synthetic detergent composition described in Example I below and the moisture content of the film when the packets are exposed to various low temperatures in handling and shipping;

FIGURE 2 illustrates the film moisture required at various low temperatures in order to be able to handle and ship without breakage unit packets of water-soluble film of polyvinyl alcohol filled with the synthetic detergent composition described in Example I below; and FIGURE 3 illustrates the equilibrium relationship at various low temperatures between water-soluble film moisture content and the relative humidity of the atmosphere within the unit packet of water-soluble film of polyvinyl alcohol filled with the synthetic detergent composition described in Example I below.

FIGURE 1 illustrates the relationship found to exist between the temperature of the packet and the percent of breakage encountered when packets prepared from water-soluble film of polyvinyl alcohol of different moisture contents and filled with a non-liquid synthetic detergent composition having sodium tripolyphosphate among its ingredients are subjected to a series of standardized physical shocks while held at a low temperature. The shock test to which the packet is exposed has been found to cause the same amount of film breakage at the same temperature as experienced in the actual shipment of the packets to market by truck. As the normal shipping container with its enclosed packets is subjected to an average of about 12 handling operations in which it is dropped or thrown between removal from the filling line at the factory and placement on sale in the store the physical shocks to which it is subjected during these transfer operations usually constitute the greater portion of the total exposure to shock for the container during the entire shipment procedure under normal conditions of road surface. Thus the amount of breakage found in films subjected to a shipping test is not decreased substantially when the over-the-road carriage portion of the test is omitted, when the total shock exposure is incurred at a uniform temperature. However, when the transport by carrier takes place at a temperature substantially lower than that of most or all of the several handling operations, the amount of breakage of the film is found to increase with the length of such transport, and the simulated shipping test then must include a step to duplicate the transportation for the desired distance in order to yield results of acceptable precision.

It is apparent from an inspection of FIG. 1 that if it is desired to ensure that packets of a water-soluble plastic film of polyvinyl alcohol, filled with a synthetic detergent composition having sodium tripolyphosphate among its ingredients, which are handled and shipped while exposed to an average temperature of 20° F. are to be found to be intact when placed on sale, the film moisture content must be at least 10% throughout the handling and shipping period. Likewise, if for reasons of economy and if the characteristics of the material so packaged permit, it is decided that a few packets of the water-soluble film may be subject to breakage, but no more than 5% shall be found to be broken when received at the store after shipment at 0° F. temperature, it is evident that the film moisture content must be maintained at about 11% to meet the objective.

FIGURE 2 represents the same data of FIG. 1 in a different form to show the minimum film moisture content which must be maintained during normal handling and shipping at various temperatures to ensure against premature breakage of the unit packets. Since the film of polyvinyl alcohol used in forming the packet is water-soluble there is a maximum level of moisture that the film can absorb and at the same time retain sufficient strength to hold its contents, while remaining free of any tendency to adhere to adjacent unit packets or the protective carton. This level of maximum safe moisture content has been determined to be about 27% $H_2O$ content in the film and this maximum permissible level is also indicated in FIGURE 2.

Since many packaged compositions may be held in a heated warehouse at the manufacturing plant for several weeks before shipment, it is apparent that the film moisture content data of FIGS. 1 and 2 refer to the moisture content of the film at the time of its exposure to shock at low temperature during shipment, but not necessarily at the time of packing. Normally, however, all product is shipped to market within a period of about three months after packing.

Moreover, the water-soluble film from which the packets are prepared will be subject to moisture loss not only to the external surroundings but also to the contents of the packet if there is present therein a material which has a greater affinity for water than the film. Such is the case when an anhydrous or partially anhydrous material possessing a strong tendency to form a hydrate is present in the contents of the packet of water-soluble film. Household synthetic detergent granules usually contain sodium tripolyphosphate as a major ingredient, and when the detergent granules are prepared in the normal manner by spray drying, the $Na_5P_3O_{10}$ present typically is found to be not more than 65% in the hexahydrate $$(Na_5P_3O_{10} \cdot 6H_2O)$$

form, with the remainder as the anhydrous form. It is the presence of the typical anhydrous $Na_5P_3O_{10}$ with its strong tendency to change to the hexahydrate form by drawing moisture from the film of the packet and other sources and thus reducing the moisture content of the film below its normal equilibrium level that makes heavy-duty synthetic detergent granules of the type described especially difficult to protect against premature rupture of water-soluble film packets containing them when exposed to cool weather and shock.

It has been found that the proper film moisture content to render a packet made from a water-soluble film of polyvinyl alcohol, and filled with a non-liquid synthetic detergent composition having sodium tripolyphosphate among its ingredients, resistant to premature rupture to the degree desired, when subject to normal shock during delayed shipment in winter weather, can be provided by including within the unit packet an inorganic or organic salt hydrate of specific characteristics in an amount adequate to maintain the relative humidity of the atmosphere within the unit packet at a high enough level to keep the film of the packet at the desired moisture content.

With a region of high humidity within the unit packets, provided by the hydrate which acts as a "moisture reservoir," to maintain adequate film moisture at low temperatures, the free space within the shipping container will be at an intermediate relative humidity between that within the unit packets and that of the external surroundings. Should the packets of water-soluble film be intended for marketing in situations where very low levels of exterior humidity or excessively long times of exposure thereto prior to usage or a combination of the two factors are expected the amount of hydrate required to provide an adequate moisture reservoir may be larger than can conveniently be included within the contents of the unit packets. In such a case the carton or shipping container holding the unit packets or both can be provided with a barrier resistant to the passage of water vapor to aid in maintaining the desired relative humidity within the unit packets.

As the conditions of low temperature to which water-soluble unit packets are exposed normally are less severe once the packets reach the store in which they are to be sold, it is usually satisfactory to maintain the desired level of relative humidity within the unit packet at least to this point. Because of the warmer exposure in the store and the home, a lower level of humidity normally will maintain the protection against premature rupture until usage.

In a preferred embodiment of this invention the inorganic or organic salt hydrate used to provide the "moisture reservoir" within the water-soluble packet performs another functional service in the composition packaged in addition to its role as a water reservoir. Thus, in a preferred embodiment of this invention a sodium or potassium pyrophosphate salt is present as a hydrate in the synthetic detergent composition packaged in the water-soluble film. The pyrophosphate salt acts, as is well known in the art, as an effective builder of detergency and also, where it is present in the composition as a hydrate, as a moisture reservoir. Where a phosphate salt is used both as a builder and as a moisture reservoir, the toal of the phosphate salt present should be no greater than five times the amount of anionic detergent present for optimum cleaning performance.

The hydrate present in the contents of the water-soluble unit packet can be added to the composition to be packaged at any stage of processing prior to the packaging operation. Since it is desirable to obtain an intimate admixture of the added hydrate into the composition, the hydrate preferably is added continuously in the desired amount to the remainder of the spray dried composition continuously or batch-wise at the entrance to a tumbling mixer although other types of mixers or blenders well known in the art can be utilized. By adding the hydrate in the manner described while the composition still is warm and sticky from the heat of the spray drying operation, the hydrate salt can be made to adhere to the exterior of the detergent particles. If the hydrate is in finely divided form maximum coverage of the detergent particles is obtained.

If desired, however, the hydrate can be added to the package without being admixed with the composition, and if so, the hydrate can be added to the water-soluble packet after the empty packet is formed from the film prior to addition of the composition thereto, or the hydrate can be added to the packet simultaneously with the addition thereto of the composition, or the hydrate can be added to the packet after the addition of the composition but prior to the closure of the packet.

The hydrate present in the contents of the water-soluble unit packet can also be formed in situ in part or in full amount by reaction at any stage of processing prior to the packaging operation. If a hydrate so formed or an added hydrate loses part or all of its water due to heating or other exposure of the composition prior to packaging, the hydrate is reformed through the addition of sufficient water to rehydrate the anhydrous salt before the packaging step. The method of water addition to a granular or powdered composition preferably is that of spraying the desired amount of water in a finely divided state onto an agitated bed of the composition although other well known means of water addition may be used. If there is present in the composition a salt which is capable of forming a hydrate of the characteristics which are desirable for use in this invention as described below, but the salt was formed and has been maintained in an anhydrous state, the hydrate is formed from the anhydrous salt prior to the packaging step in the same manner.

In a similar manner the inorganic or organic salt which is added to the composition prior to the packaging step to act as the desired moisture reservoir can be added in the anhydrous or partially anhydrous state, and the hydrate thereof formed by addition of the proper amount of water in the manner described prior to the packaging step but after the addition of the salt. After the hydrate has been added to the composition or formed through addition of water to an anhydrous or partially anhydrous salt present in the composition, the temperature at which the composition is held until the packaging operation is performed should be controlled to prevent decomposition of the hydrate by exposure to temperatures in excess of the decomposition temperature of the specific hydrate used. Likewise, the relative humidity of the atmosphere in which a composition containing a hydrate is held prior to packaging should be maintained at above about 50% by well known means to protect the hydrate against a significant loss of its water content by evaporation prior to packaging.

The hydrate to be used as a moisture reservoir must release its water of hydration readily to maintain the required relative humidity within the unit packet. Some hydrates decompose and free their water of hydration when heated to temperatures no higher than about 90° F. and, while such hydrates may be used for the purposes of this invention when the contents of the unit packet will absorb the released water without an adverse effect, the absorbed water may be undesirable if it causes a powdered material to lump. Thus the preferred hydrates for use with products where lumping is not desired are those which are stable at temperatures up to at least about 120° F. The hydrates to be used for the purposes of this invention must be compatible with the other components of the composition with which the hydrate is packaged.

Since the film moisture drops when evaporation occurs outwardly from the water-soluble films of the unit packet, the film moisture is restored to the desired level by passage of moisture from the region of higher humidity within, that level of humidity in turn being maintained by evaporation of the necessary water of hydration from the inorganic or organic salt hydrate. The relationship of film moisture to the relative humidity in contact therewith required to maintain a specific film moisture is shown in FIG. 3, and it is apparent from this figure that somewhat higher relative humidities in contact with the film are required to maintain a specific moisture content as the temperature of exposure of the film is reduced. Using the curves in FIGS. 2 and 3 one can determine the level of relative humidity that should be established within the unit packet to obtain the desired protection against premature rupture of the unit packet for the assumed degree of exposure during shipment to market. With knowledge of the level of relative humidity to be maintained, selection of one or more suitable salts to act as a moisture reservoir can be made from among those hydrates possessing, due to their water content, a vapor pressure, at the temperature to which protection is desired, at least equal to the appropriate figure in Table I (mm. Hg at atmospheric pressure), with any necessary interpolations or extrapolations. If the product in the unit packet is a powder, and possible lumping thereof is to be avoided, the hydrate selected also should be stable at a temperature of at least 120° F.

TABLE I

| At Temp. of (° F.) | Hydrate Vapor Pressure Required To Maintain Desired Percent Minimum Relative Humidity | | | | | |
|---|---|---|---|---|---|---|
| | 100%, mm. | 90%, mm. | 80%, mm. | 70%, mm. | 60%, mm. | 50%, mm. |
| 0 | 1.2 | 1.08 | .96 | .84 | .72 | .60 |
| 10 | 1.6 | 1.44 | 1.28 | 1.12 | .96 | .80 |
| 20 | 2.7 | 2.43 | 2.16 | 1.89 | 1.62 | 1.35 |
| 30 | 4.2 | 3.78 | 3.36 | 2.94 | 2.52 | 2.10 |
| 40 | 6.3 | 5.67 | 5.04 | 4.41 | 3.78 | 3.15 |
| 50 | 9.2 | 8.28 | 7.36 | 6.44 | 5.52 | 4.60 |

Several examples of inorganic salt hydrates having characteristics suitable for the purposes of the invention are: sodium pyrophosphate decahydrate ($Na_4P_2O_7 \cdot 10H_2O$); potassium pyrophosphate trihydrate ($K_4P_2O_7 \cdot 3H_2O$); sodium tetraborate decahydrate ($Na_2B_4O_7 \cdot 10H_2O$); sodium perborate tetrahydrate ($NaBO_3 \cdot 4H_2O$); and magnesium sulfate heptahydrate ($MgSO_4 \cdot 7H_2O$). Organic salt hydrates likewise are examples sodium acetate trihydrate ($NaC_2H_3O_2 \cdot 3H_2O$) and potassium benzoate trihydrate ($KC_7H_5O_2 \cdot 3H_2O$). As examples of hydrates which decompose at temperatures below about 120° F. but are still useful in some applications of this invention are sodium thiosulfate pentahydrate ($Na_2S_2O_3 \cdot 5H_2O$); sodium carbonate decahydrate ($Na_2CO_3 \cdot 10H_2O$); sodium sulfate heptahydrate ($Na_2SO_4 \cdot 7H_2O$); and sodium sulfate decahydrate ($Na_2SO_4 \cdot 10H_2O$). Hydrates possessing the largest number of water molecules in their molecules are the most efficient hydrates on a weight basis for the desired purpose, where a choice exists as to which hydrate to add.

Sodium tripolyphosphate hexahydrate $$(Na_5P_3O_{10} \cdot 6H_2O)$$

is not useful as a moisture reservoir for the purposes of this invention as it gives up its water of hydration too slowly to a region possessing a lower relative humidity than corresponds to the vapor pressure of the water of hydration of the $Na_5P_3O_{10} \cdot 6H_2O$. It is however, an excellent detergent builder and is present for that purpose in the compositions to be packaged in the water-soluble packets of this invention.

When the dry product packaged in the water-soluble film contains any material such as anhydrous sodium tripolyphosphate which as described above acts strongly to absorb available moisture, the amount of inorganic salt hydrate present as a moisture reservoir must be sufficient to convert all of the anhydrous salt to its normal hydrate form as well as to balance the expected loss of moisture by evaporation from the water-soluble film. If preferred the anhydrous tripolyphosphate can be converted to its hydrate by addition of water as described above and the amount of the hydrate salt which is required to be added to act as the moisture reservoir will be reduced accordingly.

Determination of the proper amount of inorganic or organic salt hydrate which must be present by addition to the composition in the unit packet to protect against premature rupture of the water-soluble packets can be calculated from the expected moisture loss to be encountered per unit packet, as determined from average relative humidity tabulations, knowledge of the water vapor transfer characteristics of the specific packaging material used for the carton and shipping container, the expected period of time until the packet will reach the store, the weight of film and product used in the specific application, the amount of the specific hydrate present in the composition, if any, and the required film moisture for the specific exposure conditions to be encountered determined as discussed above. In general the amount of hydrate necessary to provide the desired moisture reservoir will be found to be such that from about 5% to about 20% of the total weight of the packet contents will be hydrate water which is available readily by evaporation. The water of hydration of the sodium tripolyphosphate hexahydrate present is not readily available as discussed above, and therefore is not considered to be a portion of the water of hydration of the 5% to 20% range in weight of the composition.

The maximum range of the relative humidities which must be established and maintained within the unit packets for the purposes of this invention is from 40% to 100%. As is apparent from FIGURES 2 and 3 the lower limit to the given range of 40% relative humidity is effective only at a temperature of about 50° F., and to protect the detergent packets against premature rupture at lower temperatures a higher minimum relative humidity is required. Also, while the maximum of the range of relative humidity of 100% is useful for the purposes of this invention, condensation of free water is undesirable by exposure of a packet with a high humidity level therein unexpectedly to a temperature so low that the vapor pressure of the hydrate present becomes in excess of that required to produce a level of 100% relative humidity, as the water, if it remains unfrozen, can dissolve the packet film, or cause undesirable lumping of the composition. Therefore, it is preferred to limit the maximum relative humidity to be present within the packets of this invention to about 95% at the lowest temperature of exposure.

The water-soluble film to be used can be thermoplastic in order to be capable of being formed into packets by heat sealing two layers of the film or if not itself thermoplastic, can be coated in part or entirely in known manner with a compatible thermoplastic material to make possible formation of packets by heat-sealing, or formation of the unit packet can be performed in another manner, with the contents of the packet being inserted in any desired way. Preferred methods of operation in forming the packets from film are described at pages 395–6 of the "Encyclopedia Issue for 1958" of Modern Packaging, vol. 31, No. 3A, or as described in U.S. Patent 2,936,263. Another preferred method of forming the packets is to apply to the film immediately prior to the packet forming step by wiping thereon or by other well known means enough water to render the film tacky, and sealing the two layers of film together by pressure alone without added heat while the film is still in the tacky state.

The water-soluble films useful for forming packets to be protected against premature rupture as disclosed herein may be selected from the numerous groups of films available commercially under the term "polyvinyl alcohol," although water-soluble films of this description may contain from 0 to about 20% of polyvinyl acetates in their composition. The polyvinyl alcohol used to form the films may be of the type which is internally plasticized. Ethoxylation of the polyvinyl alcohol polymer in the manner disclosed in U.S. Patent 1,971,662 will provide internal plasticization and the resultant product is identified as the hydroxy ethyl ether of polyvinyl alcohol.

Ethoxylation of the polyvinyl alcohol polymer to the extent that the resultant polymer contains at least 9% by weight of combined ethylene oxide is desirable to obtain a water-soluble film with normal resistance to premature rupture at temperatures above about 50° F. As the degree of ethoxylation of the polyvinyl alcohol polymer is increased above the level of 9% to 12%, films made of such polymers exhibit improvement in their resistance to premature rupture when subjected to shock at low temperatures. Especially useful in this regard are ethoxylated polyvinyl alcohol polymers in film form with a content of combined ethylene oxide in excess of 15% by weight. Even water-soluble films made from such a polymer however, are unsatisfactory in resistance to premature rupture at temperatures of 0° to about 30° F., and require the presence of a moisture reservoir of the type described herein within the packet for satisfactory performance at such low temperatures.

Packets formed from water-soluble films are useful as containers for powders, granules, pellets, and larger solid masses of material. The packets so formed are useful in laundering, dishwashing, and all other general cleaning applications.

The compositions which are filled in the water-soluble packets of this invention are non-liquid water-soluble synthetic detergents which contain sodium tripolyphosphate and a hydrated salt of the type described above as two of their components. Such compositions generally contain, in addition to these two components, one or more anionic synthetic organic detergents which are generally referred to as water-soluble salts of an organic sulfuric reaction product having in its molecular structure an alkyl radical of carbon atom content within the range of about 8 to about 22 carbon atoms and a radical selected from the group consisting of sulfonic acid and sulfuric acid ester radicals. Important examples of the synthetics which form a part of the preferred compositions to be filled within the water-soluble packets of the present invention are the sodium and potassium alkyl sulfates, especially those derived by sulfation of higher alcohols produced by reduction of glycerides of tallow or coconut oil, sodium or potassium alkyl benzene sulfonates, especially those of the types described in U.S. Patents 2,220,099 and 2,477,383 in which the alkyl group contains from about 9 to about 15 carbon atoms; sodium alkyl glyceryl ether sulfonates, especially those ethers of higher alcohols from tallow and coconut oil; sodium coconut fatty acid monoglyceride sulfates and sulfonates; sodium salts of sulfuric acid esters of the reaction product of one mole of a higher fatty alcohol (e.g., tallow or coconut alcohols) and about three moles of ethylene oxide, and others known in the art, a number being specifically set forth in U.S. Patents 2,486,921 and 2,486,922.

Other ingredients of the synthetic detergent compositions to be filled within the water-soluble packets of this invention can be inorganic builders of detergency in addition to sodium tripolyphosphate as sodium or potassium pyrophosphate or orthophosphate and others known in the art; organic suds builders as for instance, higher fatty alcohols, amides and alkylol amides of fatty acids and others known in the art, a number being specifically set forth in U.S. Patents 2,383,737 and 2,383,738, alkali metal silicates for aluminum corrosion inhibition; alkyl aryl sulfonates, oxygen-containing per salts or other bleaching ingredients well known in the art; and other minor ingredients as may be desired, as for example, pigments, dyes, perfumes, redeposition inhibitors as carboxymethylcellulose, fabric substantive optical fluorescers, tarnish inhibitors for German silver and brass bactericides, and other additives useful in the art.

The following examples are given to illustrate the invention.

*Example I*

A spray dried water-soluble granular synthetic detergent of the composition:

| | Parts |
|---|---|
| Sodium tripolyphosphate | 38 |
| Sodium pyrophosphate | 9 |
| Sodium orthophosphate | 3 |
| Sodium alkyl ($C_{14-18}$) sulfate | 11 |
| Sodium alkyl ($C_9$–$C_{15}$) benzene sulfate | 6 |
| Sodium sulfate | 13 |
| Sodium silicate solids | 6 |
| Alkyl ($C_8$–$C_{18}$) monoethanolamide | 2 |
| Water | 10 |
| Miscellaneous additives | 2 | was produced. The pyrophosphate and orthophosphate salts present in the composition were introduced therein either as impurities in the tripolyphosphate as received from the manufacturer, or by the hydrolysis of a portion of the tripolyphosphate during the processes of crutching and spray drying the composition. Of the 10% moisture found in the composition, 8.3% was present in hydrates of the phosphate salts, distributed as follows: 6.2% as hexahydrate of tripolyphosphate, 1.2% as decahydrate of pyrophosphate, and 1.0% as dodecahydrate of orthophosphate. The amount by weight of the total composition which was present as water of hydration useful as a moisture reservoir therefore was 2.2%. A portion of the composition was encased in packets by heat sealing in a 1.5 mil thick water-soluble film of polyvinyl alcohol of the type described herein.

To another portion of the composition was added with intimate mixing sodium pyrophosphate decahydrate ($Na_4P_2O_7 \cdot 10H_2O$) in the proportion of 16.8 parts of added hydrate to 83.2 parts of the composition. The resulting mixture possessed 5.9% by weight of water of hydration content useful as a moisture reservoir. After the tripolyphosphate had become fully hydrated, packets of the mixture were prepared by heat sealing in 1.5 mil thick water-soluble film of polyvinyl alcohol.

Eight packets each of the original composition and of the mixture with added sodium pyrophosphate decahydrate were placed in each of four shipping containers. One of the containers was stored at each of the temperatures of 0° F., 20° F., 40° F., and 50° F. for a minimum of 24 hours so that the contents of the container were at the storage temperature, and then the containers were subjected immediately upon removal from the region of controlled temperature to a standardized shock test after which the number of ruptured packets per container was determined.

The standardized shock test consists of five consecutive free drops of the shipping container onto the floor with the container being dropped on its bottom, four of the drops being of a one foot distance followed by one of a three foot distance to match the shock history encountered by a container in handling in warehouse transfers and loading of the carrier. The container is then placed on a flat surface that is moved in a horizontal plane at 204 cycles per minute through a 1″ amplitude per cycle for a 10 minute period to correspond to a trip by carrier equivalent to 500 miles over a normal road surface. Then follow seven additional drops to the floor, six of one foot distance on the bottom of the container and one of a two foot distance on an end of the container to simulate the handling experience in unloading the carrier, warehousing, and handling within the store. At the conclusion of the test the number of ruptured packets was determined. The relative humidity of the atmosphere within duplicate packets stored under the same conditions was determined.

The results were as follows:

| Storage Temp. | Packets without added hydrate | | | Packets with added hydrate | | |
|---|---|---|---|---|---|---|
| | No. of Packets | No. Broken after Test | Percent RH | No. of Packets | No. Broken after Test | Percent RH |
| 50° F | 8 | 0 | 45 | 8 | 0 | 75 |
| 40° F | 8 | 2 | 46 | 8 | 0 | 80 |
| 20° F | 8 | 8 | 47 | 8 | 0 | 84 |
| 0° F | 8 | 8 | 50 | 8 | 6 | 92 |

Substantially the same improvement in resistance to premature rupture at low temperatures can be obtained by the substitution of sodium perborate tetrahydrate for the sodium pyrophosphate decahydrate as the hydrate to be added to the synthetic detergent.

*Example II*

To 75 parts of the spray dried water-soluble synthetic detergent of the composition of Example I, 25 parts of sodium pyrophosphate decahydrate were added and admixed thoroughly. The mixture possessed 9.5% by weight of water of hydration content useful as a moisture reservoir after the tripolyphosphate had become fully hydrated. Packets of the mixture were encased in 1.5 mil thick water-soluble polyvinyl alcohol film and after temperature equilibration were exposed to the shock test described in Example I. The following number of broken packets and relative humidities on duplicate packets were found:

|  | 50° F. | 40° F. | 20° F. | 0° F. |
| --- | --- | --- | --- | --- |
| No. of Packets | 8 | 8 | 8 | 8 |
| No. Broken after Test | 0 | 0 | 1 | 5 |
| Percent RH | 75 | 80 | 84 | 92 |

Substantially the same improvement in resistance to premature rupture at low temperatures can be obtained by the substitution of potassium benzoate trihydrate for the sodium pyrophosphate decahydrate as the hydrate to be added to the synthetic detergent in packets formed from film of a thickness of 3 mils.

*Example III*

To 82 parts of the spray dried water-soluble synthetic detergent of the composition of Example I, 10 parts of an anhydrous sodium pyrophosphate was added, and 8 parts of water sprayed onto the mixture in a revolving drum mixer. The mixture possessed 7.3% by weight of water of hydration content useful as a moisture reservoir after the tripolyphosphate had become fully hydrated. Packets of the mixture were encased in 1.5 mil thick water-soluble polyvinyl alcohol film and after temperature equilibration were exposed to the standardized shock test. The following number of broken packets and relative humidities in duplicate packets were found:

|  | 50° F. | 40° F. | 20° F. | 0° F. |
| --- | --- | --- | --- | --- |
| No. of Packets | 8 | 8 | 8 | 8 |
| No. Broken after Test | 0 | 0 | 0 | 0 |
| Percent Relative Humidity | 84 | 88 | 94 | 96 |

Substantially the same results can be obtained by substitution of sodium carbonate decahydrate for the sodium pyrophosphate decahydrate as the hydrate to be added in packets formed from the film of water-soluble polyvinyl alcohol of ¼ mil thickness.

*Example IV*

To 70 parts of the spray dried water-soluble synthetic detergent of the composition of Example I, 10 parts of anhydrous sodium pyrophosphate were added and admixed thoroughly. While still being mixed 20 parts of water was sprayed thereon. The mixture possessed 19.3% by weight of water of hydration content useful as a moisture reservoir after the tripolyphosphate had been fully hydrated. Packets of the mixture were encased in 1.5 mil thick film of water-soluble polyvinyl alcohol and after temperature equilibrium were exposed to the shock test described in Example 1. The following number of broken packets were found following testing:

|  | 50° F. | 40° F. | 20° F. | 0° F. |
| --- | --- | --- | --- | --- |
| No. of Packets | 8 | 8 | 8 | 8 |
| No. Broken after Test | 0 | 0 | 0 | 0 |

The relative humidity within the packets was the same as in Example III. Substantially the same results can be obtained from substitution of a mixture of equal parts of anhydrous sodium acetate and anhydrous sodium sulfate for the anhydrous sodium pyrophosphate.

*Example V*

A spray dried water-soluble granular synthetic detergent of the composition:

| | Parts |
| --- | --- |
| Sodium tripolyphosphate | 38 |
| Sodium pyrophosphate | 8 |
| Sodium orthophosphate | 2 |
| Sodium alkyl ($C_9$–$C_{15}$) benzene sulfonate | 14 |
| Ucon DA1905 | 2 |
| Hydrogenated fish oil sodium soap | 2 |
| Sodium sulfate | 19 |
| Sodium silicate solids | 10 |
| Moisture | 2 |
| Miscellaneous additives | 3 | was produced. The pyrophosphate and orthophosphate salts present in the composition were introduced therein either as impurities in the tripolyphosphate as received from the manufacturer, or by the hydrolysis of a portion of the tripolyphosphate during the processes of crutching and spray drying the composition. Of the 2% moisture present in the composition, 1.8% was present as water of hydration of the various phosphate salts, and substantially all of this amount was tied up as the hexahydrate of the tripolyphosphate, leaving essentially none in combination with the pyrophosphate and orthophosphate. A portion of the composition was encased in a 1.5 mil thick film of water soluble polyvinyl alcohol of the type described herein.

To another portion of the composition was added with intimate mixing sodium pyrophosphate decahydrate in the proportion of 25 parts of added hydrate to 75 parts of the composition. The resultant mixture contained 4.9% by weight of water of hydration useful as a moisture reservoir after the tripolyphosphate had become fully hydrated. Packets of the mixture were prepared by heat sealing in 1.5 mil thick water-soluble film of polyvinyl alcohol.

The packets of the composition without added hydrate and those of the mixture with the added hydrate were exposed to various low temperatures until at equilibrium and then subjected at once to the standardized shock test described in Example I. The following number of broken packets were found on examination of the packets following testing, and the relative humidities found in duplicate packets were:

| Storage Temp. | Packets without added hydrate | | | Packets with added hydrate | | |
| --- | --- | --- | --- | --- | --- | --- |
| | No. of Packets | No. Broken after Test | Percent RH | No. of Packets | No. Broken after Test | Percent RH |
| 50° F | 8 | 3 | 20 | 8 | 0 | 40 |
| 40° F | 8 | 4 | 23 | 8 | 0 | 42 |
| 20° F | 8 | 8 | 26 | 8 | 2 | 45 |
| 0° F | 8 | 8 | 30 | 8 | 3 | 45 |

Substantially equivalent results can be obtained by the substitution of potassium pyrophosphate trihydrate for the sodium pyrophosphate decahydrate as the added hydrate.

What is claimed is:
1. A packet consisting of:
 (1) an envelope of polyvinyl alcohol in film form, said film being from about one quarter to about three mils in thickness, and containing no more than about 27% moisture, and enclosed therein
 (2) a water-soluble granular synthetic detergent composition consisting essentially of
  (a) an anionic non-soap synthetic organic detergent,
  (b) sodium tripolyphosphate in an amount to act as a builder for said synthetic detergent, and
  (c) sodium pyrophosphate decahydrate,
   said pyrophosphate decahydrate being present, subsequent to the completion of hy- dration of said sodium tripolyphosphate to the hexahydrate form and the completion of hydration of any other hydratable ingredients of said composition, in an amount such that the water of hydration of said decahydrate constitutes from about 5% to about 20% of the total weight of said composition, whereby said polyvinyl alcohol film is prevented from becoming brittle at temperatures below about 50° F. by the maintenance of a relative humidity in the atmosphere within said packet of from about 40% to 100% at temperatures from about 0° F. to 50° F. so that said polyvinyl alcohol film forming said packet is resistant to rupture during a substantial delivery and marketing period.

2. A packet consisting of:
(1) an envelope of polyvinyl alcohol in film form, said film being from about one quarter to about three mils in thickness, and containing no more than about 27% moisture, and enclosed therein
(2) a water-soluble granular synthetic detergent composition consisting essentially of
    (a) an anionic non-soap synthetic organic detergent,
    (b) sodium tripolyphosphate in an amount to act as a builder for said synthetic detergent, and
    (c) a salt hydrate chosen from the group consisting of sodium pyrophosphate decahydrate, potassium pyrophosphate trihydrate, sodium tetraborate decahydrate, sodium perborate tetrahydrate, magnesium sulfate heptahydrate, sodium acetate trihydrate, potasium benzoate trihydrate, sodium thiosulfate pentahydrate, sodium carbonate decahydrate, sodium sulfate heptahydrate and sodium sulfate decahydrate,
        said salt hydrate being present, subsequent to the completion of hydration of said sodium tripolyphosphate to the hexahydrate form and the completion of hydration of any other hydratable ingredients of said composition, in an amount such that the water of hydration of said salt hydrate constitutes from about 5% to about 20% of the total weight of said composition, whereby said polyvinyl alcohol film is prevented from becoming brittle at temperatures below about 50° F. by the maintenance of a relative humidity in the atmosphere within said packet of from about 40% to 100% at temperatures from about 0° F. to 50° F. so that said polyvinyl alcohol film forming said packet is resistant to rupture during a substantial delivery and marketing period.

3. A process for producing detergent packages comprising packets of water-soluble film of polyvinyl alcohol, said film being from about one quarter to about three mils in thickness, and containing no more than about 27% moisture and being characterized by a tendency to become brittle at temperatures below about 50° F. upon loss of a substantial amount of its original moisture content, said packet enclosing a water-soluble spray dried synthetic detergent composition consisting essentially of an anionic non-soap synthetic organic detergent and sodium tripolyphosphate in an amount to act as a builder in said synthetic detergent composition as one of its essential components, said packets possessing improved resistance to premature rupture when subjected to physical shock at low temperatures by the maintenance of a relative humidity within said packets of from about 40% to 100% at temperatures from about 0° F. to about 50° F., comprising spraying water on an agitated bed of said composition, said water being added substantially in the amount necessary to hydrate fully any unhydrated component therein, and admixing with said composition at least one compatible salt chosen from the group consisting of sodium pyrophosphate decahydrate, potassium pyrophosphate trihydrate, sodium tetraborate decahydrate, sodium perborate tetrahydrate, magnesium sulfate heptahydrate, sodium acetate trihydrate, potassium benzoate trihydrate, sodium thiosulfate pentahydrate, sodium carbonate decahydrate, sodium sulfate heptahydrate and sodium sulfate decahydrate, in an amount such that the water of hydration of said admixed salt hydrate comprises about 5% to 20% of the total weight of said composition, thereafter protecting said composition against loss of a significant portion of hydrate water by holding said composition at a temperature below the decomposition point of said hydrate in an atmosphere having a relative humidity above about 50% until the packaging operation, and sealing said composition in desired amounts in said water-soluble film.

References Cited by the Examiner
UNITED STATES PATENTS

| | | | |
|---|---|---|---|
| 2,750,027 | 6/56 | Cummings | 206—0.5 |
| 2,875,155 | 2/59 | Miles | 252—138 |
| 2,936,263 | 5/60 | Hardt et al. | 167—55 |

FOREIGN PATENTS

| | | |
|---|---|---|
| 510,555 | 3/55 | Canada. |
| 1,053,739 | 3/59 | Germany. |

OTHER REFERENCES

"Elvanol" Polyvinyl Alcohols, publication of E. I. DuPont, 1947, pp. 17 and 19.

ALBERT T. MEYERS, *Primary Examiner.*
JULIUS GREENWALD, *Examiner.*